United States Patent
Culbertson et al.

(10) Patent No.: US 10,415,360 B2
(45) Date of Patent: Sep. 17, 2019

(54) DOWNHOLE SEPARATION FOR WELL PRODUCTION OPERATIONS

(71) Applicant: ODESSA SEPARATOR, INC., Odessa, TX (US)

(72) Inventors: Daniel L. Culbertson, Odessa, TX (US); Cavin B. Frost, Odessa, TX (US); Floyd Randolph Simonds, Odessa, TX (US); Dañelle N. Campbell, Odessa, TX (US); Lowell C. Kirkland, Odessa, TX (US)

(73) Assignee: ODESSA SEPARATOR, INC., Odessa, TX (US)

( * ) Notice: Subject to any disclaimer, the term of this patent is extended or adjusted under 35 U.S.C. 154(b) by 125 days.

(21) Appl. No.: 15/461,133

(22) Filed: Mar. 16, 2017

(65) Prior Publication Data

US 2017/0268322 A1    Sep. 21, 2017

Related U.S. Application Data

(60) Provisional application No. 62/403,514, filed on Oct. 3, 2016, provisional application No. 62/309,730, filed on Mar. 17, 2016.

(51) Int. Cl.
*E21B 43/08*    (2006.01)
*E21B 43/38*    (2006.01)
*B01D 19/00*    (2006.01)
*E21B 43/12*    (2006.01)

(52) U.S. Cl.
CPC .............. *E21B 43/38* (2013.01); *B01D 19/00* (2013.01); *E21B 43/127* (2013.01)

(58) Field of Classification Search
CPC ............ E21B 43/08; E21B 43/38; E21B 43/36
See application file for complete search history.

(56) References Cited

U.S. PATENT DOCUMENTS

| | | | | |
|---|---|---|---|---|
| 4,231,767 A | * | 11/1980 | Acker | B01D 19/0031 166/105.5 |
| 5,154,588 A | | 10/1992 | Freet et al. | |
| 5,411,088 A | * | 5/1995 | LeBlanc | B01D 19/0031 166/105.1 |
| 5,868,200 A | * | 2/1999 | Bryant | E21B 43/08 166/51 |

(Continued)

OTHER PUBLICATIONS

Odessa Separator, Inc.; "Bypass Valve/ Intake System", company brochure, received Oct. 2, 2016, 1 page.

(Continued)

*Primary Examiner* — Cathleen R Hutchins
(74) *Attorney, Agent, or Firm* — Smith IP Services, P.C.

(57) ABSTRACT

A downhole fluid separation apparatus can include multiple sections connected together with connectors, the connectors providing fluid communication between annuli in adjacent ones of the sections, and between inner conduits in adjacent ones of the sections. Each connector can include at least one flow passage providing communication between an inner conduit of each of the connected sections, and another flow passage providing communication between an annulus of each of the connected sections. A bypass valve can be included that opens in response to a predetermined differential pressure between an exterior of the apparatus and the inner conduits.

27 Claims, 15 Drawing Sheets

(56) References Cited

U.S. PATENT DOCUMENTS 8,881,803 B1 11/2014 Frost
2013/0327528 A1* 12/2013 Frost ..................... E21B 37/06
166/304

OTHER PUBLICATIONS

Odessa Separator, Inc.; "Dual Body Super Gas and Sand Shield", company brochure, received Oct. 2, 2016, 1 page.
Odessa Separator, Inc.; "Gas Shield", company brochure, received Oct. 2, 2016, 1 page.
Odessa Separator, Inc.; "Slotted Gas Shield", company brochure, received Oct. 2, 2016, 1 page.
Odessa Separator, Inc.; "Super Gas and Sand Shield", company brochure, received Oct. 2, 2016, 1 page.
McCoy, J.N., et al.; "Improved Downhole Gas Separators", paper for the department of Petroleum Engineering, dated Apr. 7 & 8, 1998, 11 pages.

\* cited by examiner

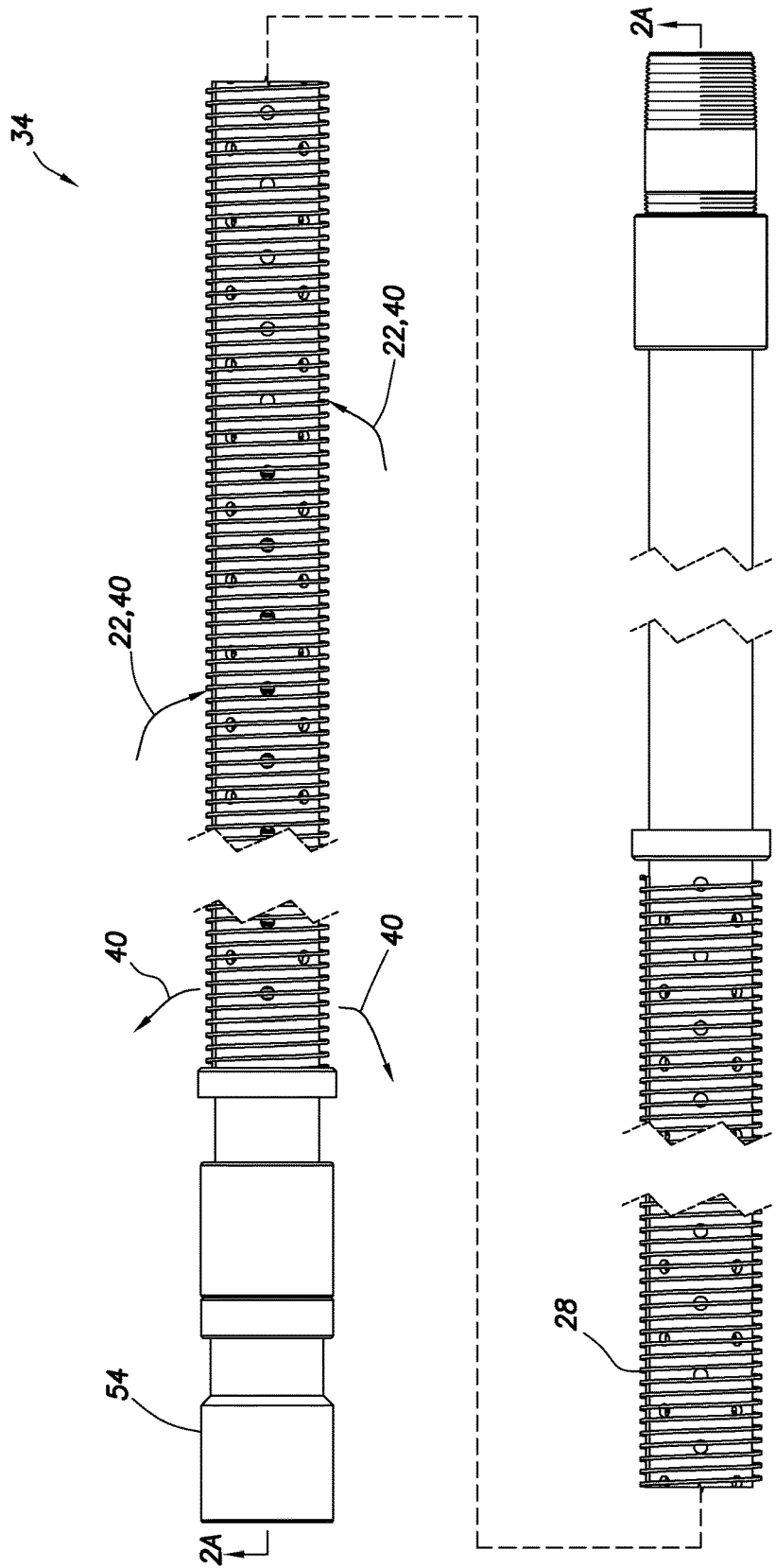

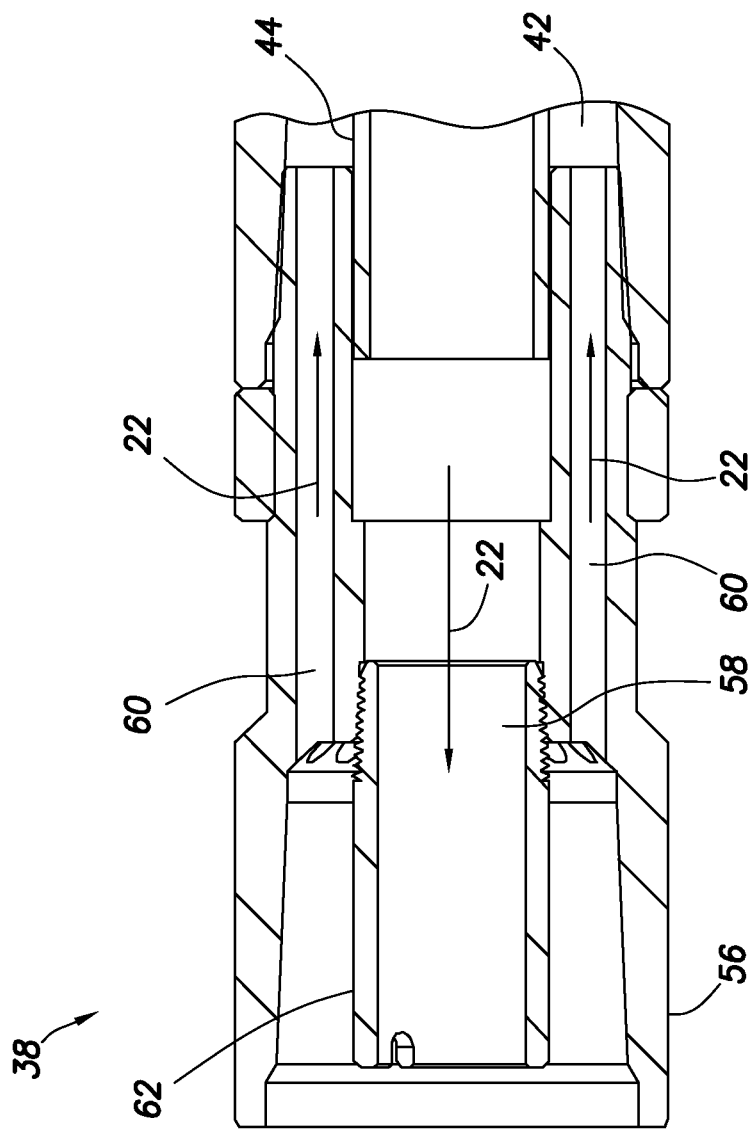

DOWNHOLE SEPARATION FOR WELL PRODUCTION OPERATIONS

BACKGROUND

This disclosure relates generally to equipment utilized and operations performed in conjunction with subterranean wells and, in an example described below, more particularly provides for downhole separation in well production operations.

Well production efficiency can be substantially increased by avoiding, or at least diverting, production of undesired substances. For example, with a well intended for liquid hydrocarbon production, it is generally undesirable to also produce gas or water, and it is always undesirable to produce sand or other particulate debris.

Downhole separation can be used to exclude fluids (liquids such as water, gas condensates, etc., and gases) and other substances from desirably produced liquids. The excluded substances may remain downhole, or they may be separately produced (such as, in the case of hydrocarbon gas).

It will, thus, be readily appreciated that improvements are continually needed in the arts of designing, constructing and utilizing downhole separation apparatus. Such improvements may be useful in a wide variety of different well production operations.

DETAILED DESCRIPTION

Figure 1:
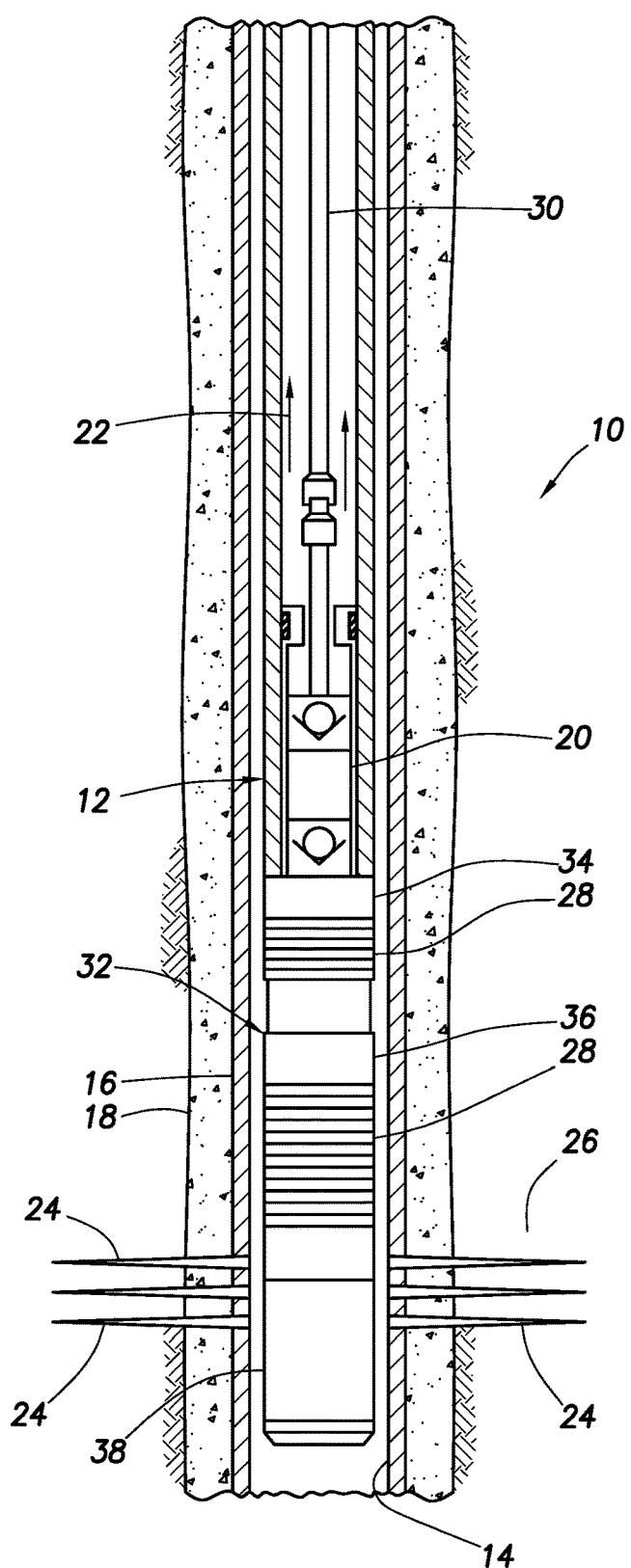
FIG. 1 is a representative partially cross-sectional view of an example of a downhole fluid separation system and associated method which can embody principles of this disclosure.

Representatively illustrated in FIG. 1 is an example of a downhole fluid separation system 10 for use with a subterranean well, and an associated method, which can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

As depicted in FIG. 1, a tubular string 12 (such as a production tubing string) has been installed in a wellbore 14 lined with casing 16 and cement 18. In other examples, the system 10 could be used in an uncased or open hole section of the wellbore 14.

In the FIG. 1 example, the tubular string 12 includes an artificial lift pump 20. The pump 20 is used to displace produced liquid 22 through the tubular string 12 to surface. The liquid 22 enters the wellbore 14 via perforations 24, which are formed through the casing 16 and cement 18, and into an earth formation 26.

The pump 20 is depicted as being a reciprocating rod-type pump in FIG. 1. A rod string 30 is reciprocated in the tubular string 12 to operate the pump 20 (for example, using a walking beam or hydraulic actuator at surface). However, in other examples, the pump 20 could instead be an electric submersible pump, a fluid jet pump or another artificial lift apparatus. Thus, the scope of this disclosure is not limited to use of any particular artificial lift apparatus, or to use of an artificial lift apparatus at all.

The liquid 22 enters the tubular string 12 via one or more well screens 28. The screens 28 filter sand, debris or other undesired particles from the liquid 22, so that they do not damage or otherwise hinder operation of the pump 20, impede flow of the liquid, or cause other damage or maintenance problems in operation of the well.

As depicted in FIG. 1, the screen 28 is of the type known to those skilled in the art as a wire-wrapped screen. An outer shroud (not shown) may be provided to protect a filter element of the screen 28. In other examples, the screen 28 could instead be a mesh-type, sintered powder-type, prepacked, slotted pipe or other type of screen or filter. Thus, the scope of this disclosure is not limited to use of any particular type of well screen.

Note that the well screen 28 is merely one example of an item of well equipment that may be used to receive produced liquid 22 into the tubular string 12. It will, therefore, be appreciated that the scope of this disclosure is not limited to any particular combination, configuration or arrangement of equipment in the tubular string 12.

In the FIG. 1 example, the screens 28 are part of a fluid separation apparatus 32 connected in the tubular string 12 below the pump 20 (e.g., the pump being between the fluid separation apparatus and the surface). In this manner, the fluid separation apparatus 32 can prevent gas from entering the pump 20 and causing a condition known to those skilled in the art as "gas lock." Gas lock is undesirable, since it greatly reduces an efficiency of the pump 20 in displacing liquids to the surface.

As the apparatus 32 is depicted in FIG. 1, the apparatus includes an upper section 34, an intermediate section 36 and a lower section 38. Although only one of each of the sections 34, 36, 38 is shown in FIG. 1, other numbers or types of sections may be used in the apparatus 32, as appropriate for a given application.

For example, if a relatively large proportion of gas is expected to be produced with the liquid 22, multiple intermediate sections 36 may be used. If production of sand with the liquid 22 is expected, one or more vortex de-sanders (e.g., as described in U.S. Pat. No. 8,881,803, the entirety of which is incorporated herein by this reference) could be included in or above the lower section 38. Thus, the scope of this disclosure is not limited to any particular number or type of sections in the apparatus 32.

In the FIG. 1 apparatus 32, the upper section 34 receives the liquid 22 from the wellbore 14, the screen 28 of the upper section filters relatively large sand and debris from the liquid 22, and the pump 20 receives the liquid from the upper section. Thus, the upper section 34 both receives the liquid 22 from the wellbore 14 and discharges the liquid to the pump 20, and the upper section both filters sand and debris from the liquid 22 and begins a process of separating gas from the liquid, as described more fully below.

The intermediate section 36 can also receive the liquid 22 from the wellbore 14, filter sand and debris from the liquid, and serve to separate gas from the liquid. In an example described more fully below, the intermediate section 36 can be configured in a manner allowing any number of intermediate sections to be conveniently connected together.

The lower section 38 in this example receives the liquid 22 after (all or a substantial amount of) the gas has been separated from the liquid, and provides a lower end of a conduit for flowing the liquid through the apparatus 32 to the pump 20. The lower section 38 can also include one or more well screens for further filtering of particulate matter from the liquid 22, and can include other components (such as, a vortex-type de-sander).

Figure 2A:
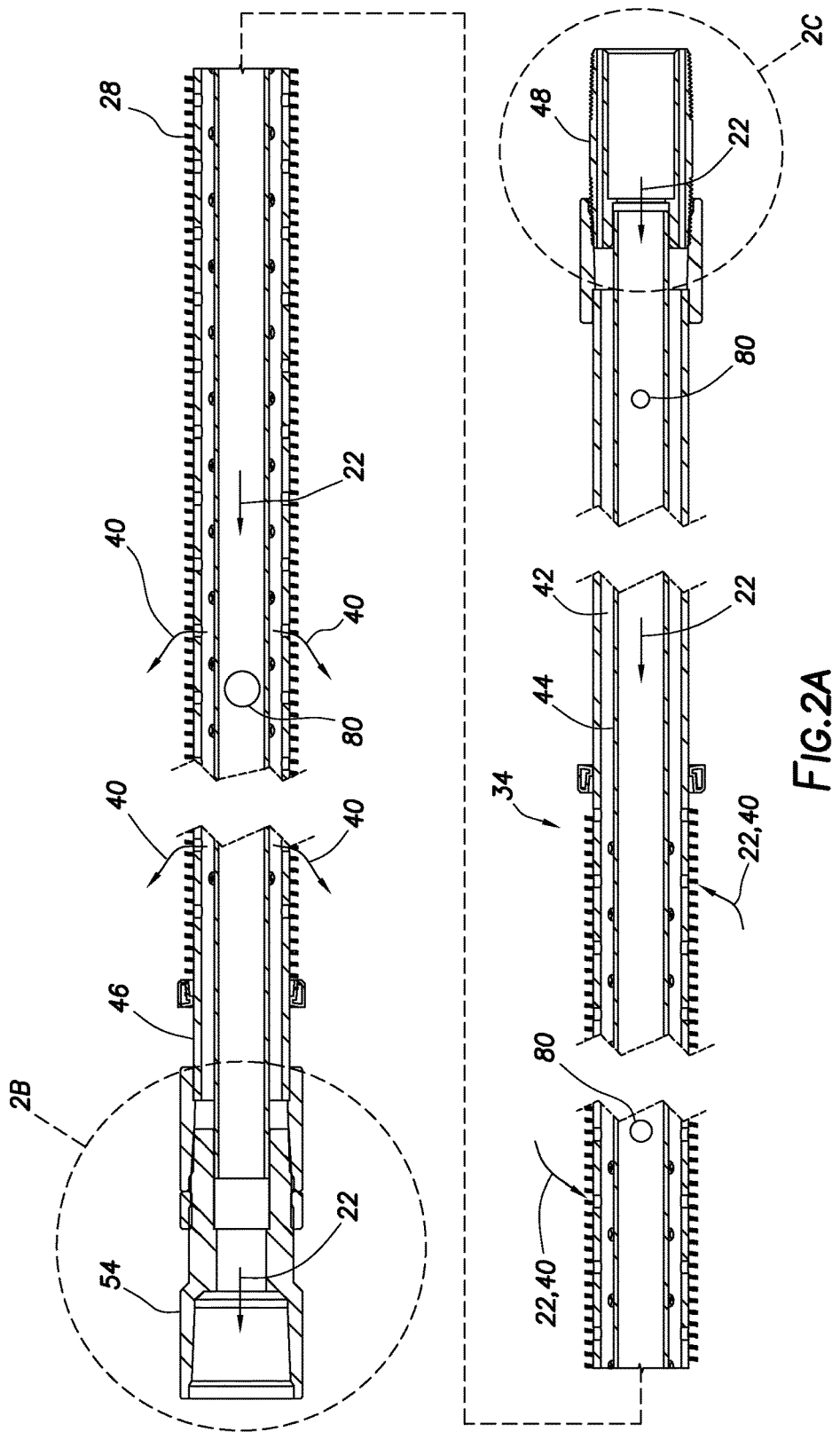
FIGS. 2-2C are representative elevational, cross-sectional and detail views of an upper section of a fluid separation apparatus that may be used in the system and method of FIG. 1, and which may embody the principles of this disclosure.
Figure 2B:
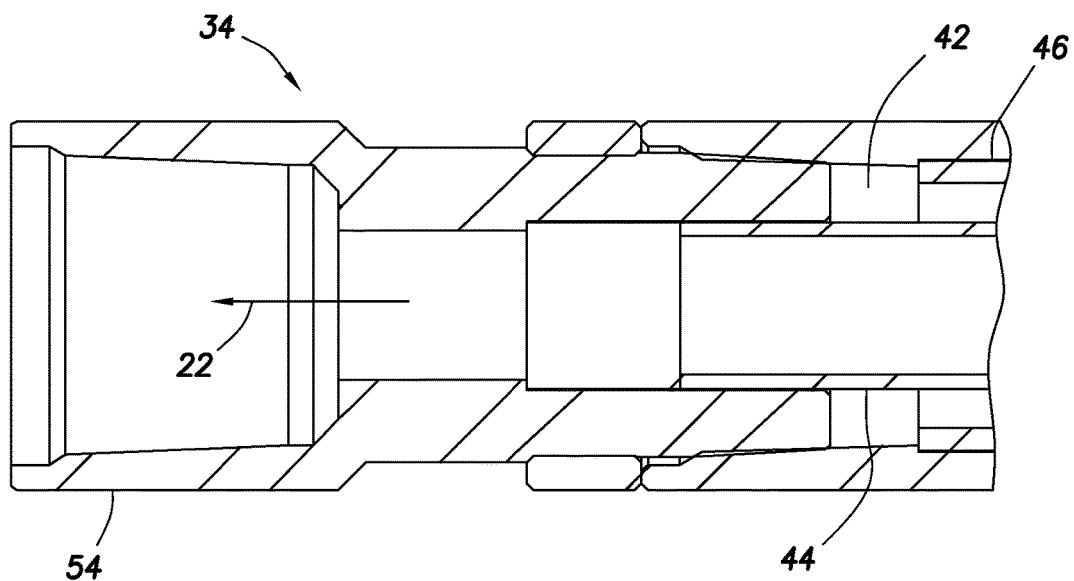
Figure 2C:
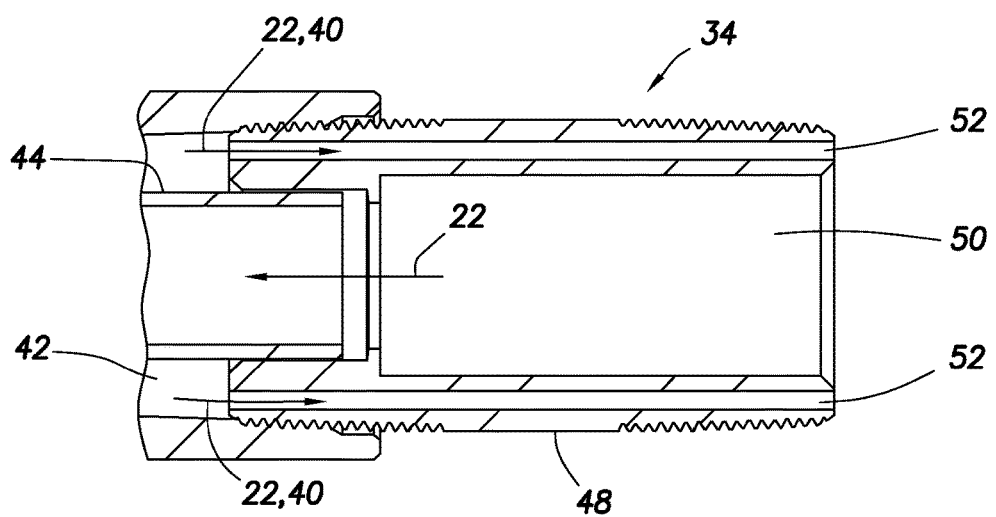

Referring additionally now to FIGS. 2-2C, the upper section 34 is representatively illustrated apart from the remainder of the apparatus 32. FIG. 2 depicts a side view, FIG. 2A depicts a cross-sectional view taken along line 2A-2A of FIG. 2, FIG. 2B depicts an enlarged detail of an upper end, and FIG. 2C depicts a detail of a lower end of the upper section 34.

The screen 28 receives the liquid 22 and a gas 40 combined therewith from the wellbore 14, and filters sand and debris from the liquid and gas. The combined liquid 22 and gas 40 flow into an annulus 42 formed radially between an inner conduit 44 and a base pipe 46 of the screen 28.

The combined liquid 22 and gas 40 flow downwardly through the annulus 42 to a lower connector 48. The lower connector 48 is uniquely configured to allow downward flow of the combined liquid 22 and gas 40, to allow upward flow of the liquid 22 through the inner conduit 44, and to provide for connecting the upper section 34 to the intermediate section 36.

Note that the lower connector 48 in this example includes a central longitudinal flow passage 50 for communicating with the inner conduit 44, and multiple circumferentially distributed longitudinal flow passages 52 for communicating with the annulus 42. The lower connector 48 is connected to the screen 28 and the intermediate section 36 by threading, but in other examples different connection means may be used.

An upper connector 54 receives the liquid 22 from the inner conduit 44 and connects to the pump 20, so that the pump can receive the liquid 22. In this example, the upper connector 54 connects to the screen 28 and the pump 20 (or other component of the tubular string 12, such as a seating nipple, etc.) by threading, but in other examples different connection means may be used.

Gas 40 that separates from the liquid 22 in the annulus 42 can flow outward through the screen 28 into the wellbore 14. Preferably, the annulus 42 has a substantial length so that, while the liquid 22 and gas 40 are present in the annulus 42, the gas can separate from the liquid and rise in the annulus to the screen 28 of the upper section 34. Thus, the liquid 22 (having relatively greater density) tends to fall in the annulus 42, and the gas 40 (having relatively less density) tends to rise in the annulus, and the gas can escape from the annulus at or near an upper end thereof via the screen 28.

Figure 3:
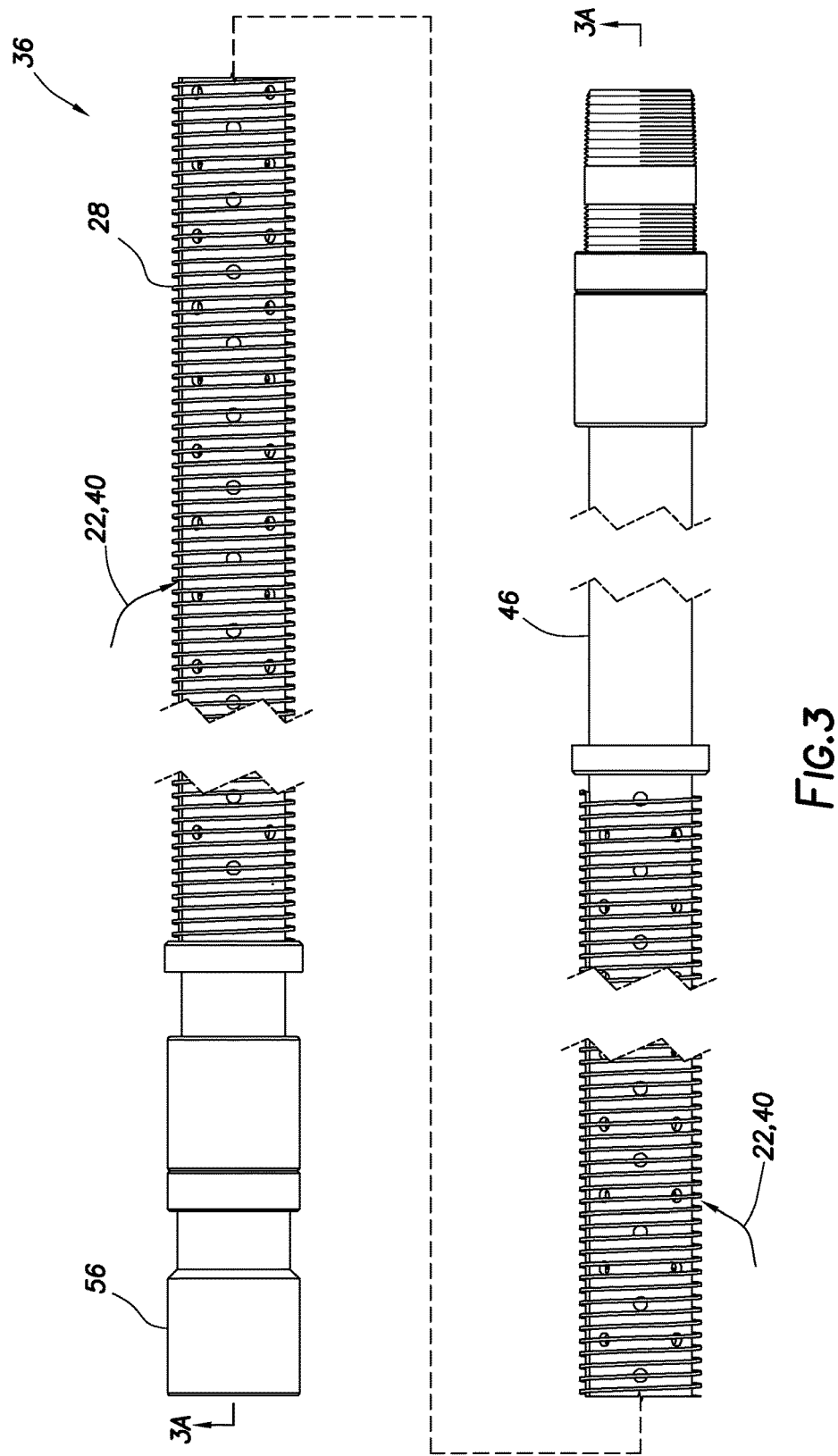
FIGS. 3-3C are representative elevational, cross-sectional and detail views of an intermediate section of the fluid separation apparatus.
Figure 3A:
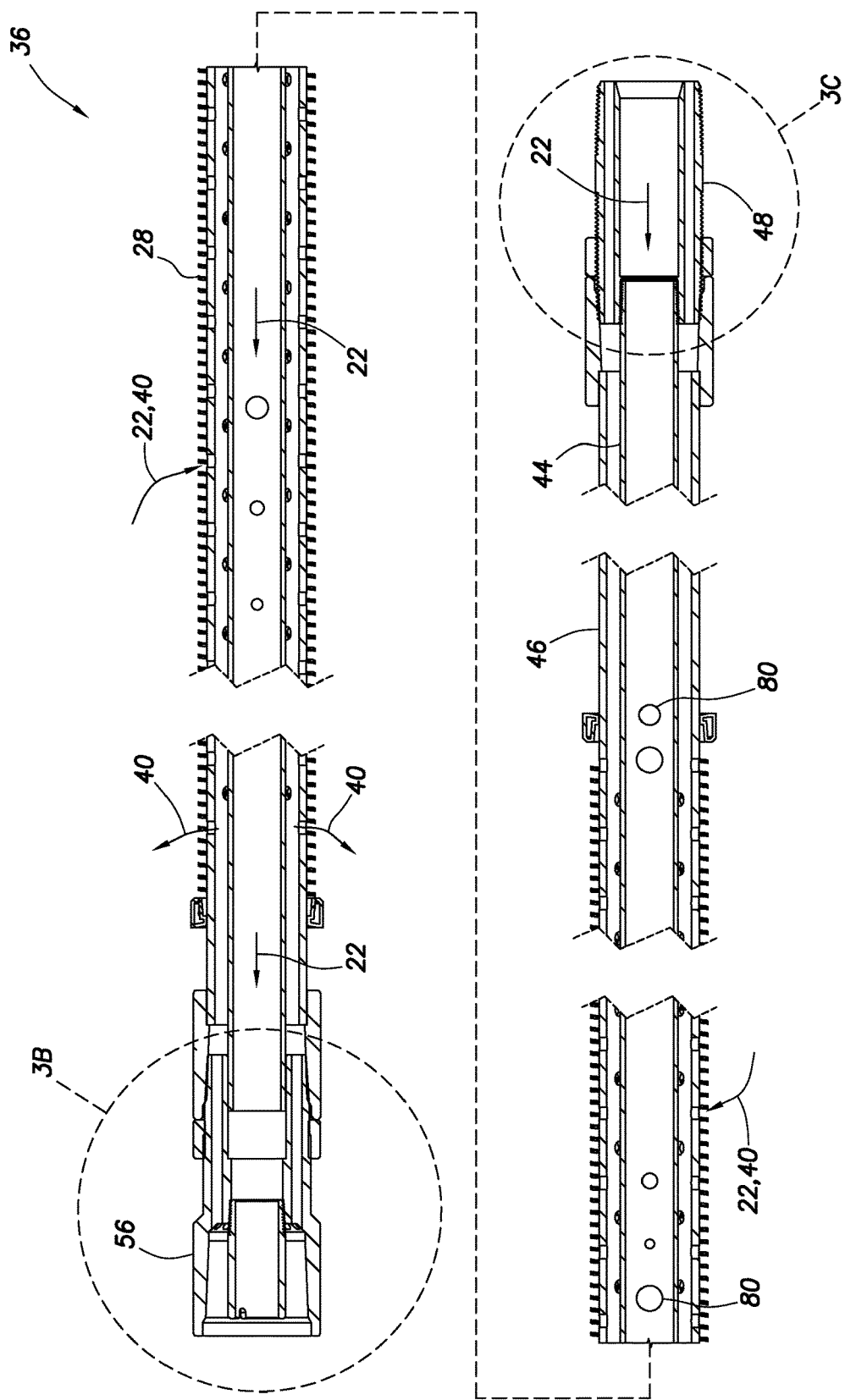
Figure 3B:
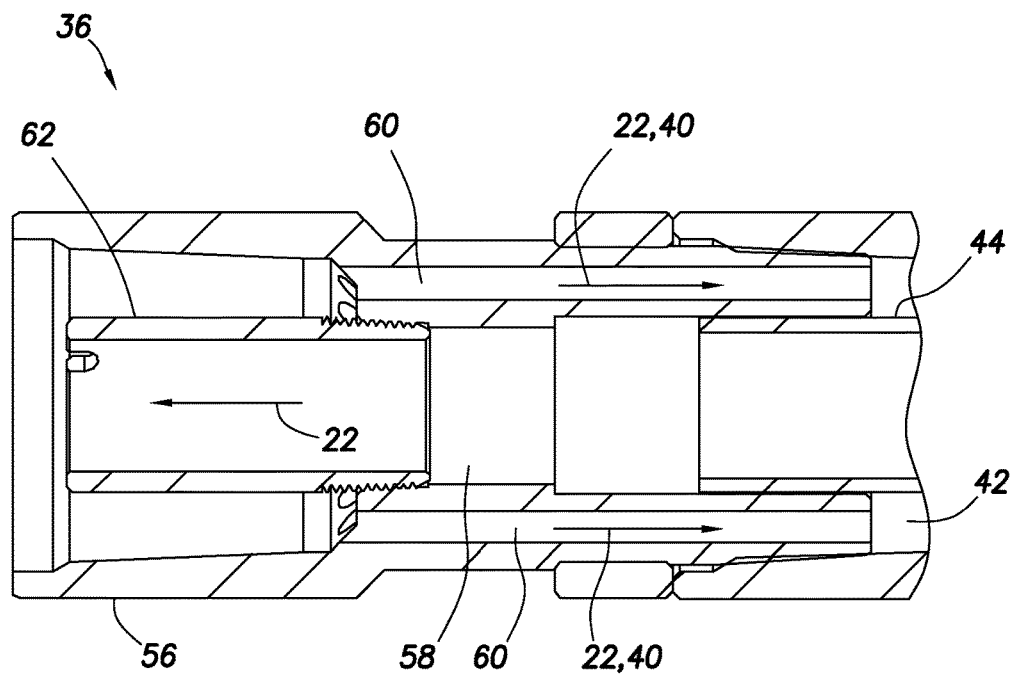
Figure 3C:
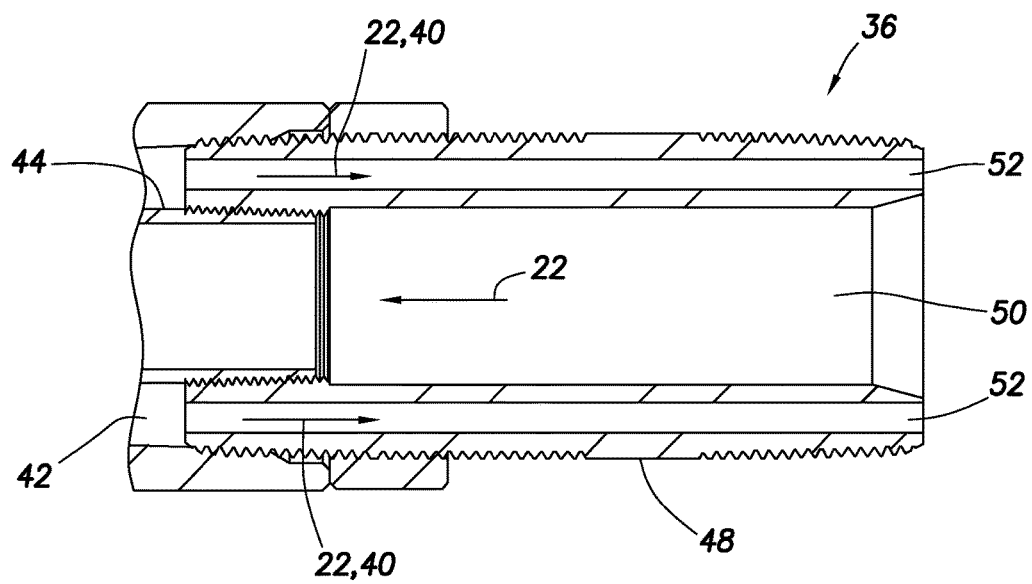

Referring additionally now to FIGS. 3-3C, the intermediate section 36 is representatively illustrated apart from the remainder of the apparatus 32. FIG. 3 depicts a side view, FIG. 3A depicts a cross-sectional view taken along line 3A-3A of FIG. 3, FIG. 3B depicts an enlarged detail of an upper end, and FIG. 3C depicts a detail of a lower end of the intermediate section 36.

The screen 28 of the intermediate section 36 receives the liquid 22 and gas 40 combined therewith from the wellbore 14, and filters sand and debris from the liquid and gas. The combined liquid 22 and gas 40 flow into the annulus 42 formed radially between the inner conduit 44 and the base pipe 46 of the screen 28.

The combined liquid 22 and gas 40 flow downwardly through the annulus 42 to a lower connector 48. Similar to that described above for the upper section 34, the lower connector 48 of the intermediate section 36 allows downward flow of the combined liquid 22 and gas 40, allows upward flow of the liquid 22 through the inner conduit 44, and provides for connecting the intermediate section 36 to the lower section 38 (or to another intermediate section 36).

An upper connector 56 receives the liquid 22 from the inner conduit 44 and connects to the upper section 34 (or to another intermediate section), so that the next section above can receive the liquid 22 via a central longitudinal flow passage 58. The upper connector 56 also includes multiple circumferentially distributed longitudinal flow passages 60 that receive the combined liquid 22 and gas 40 from the annulus 42 in the upper section 34 (or another intermediate section) and communicate the liquid and gas to the annulus 42 in the intermediate section 36.

Note that the upper connector 56 includes a connector tube 62 that can be received in the flow passage 50 of the lower connector 48 so that, when an upper connector 56 is connected to a lower connector 48, the inner conduits 44 of adjacent sections are in communication with each other and the annuli 42 of adjacent sections are in communication with each other. The combined liquid 22 and gas 40 can flow downward through the connected flow passages 52, 60, and the liquid 22 can flow upward through the connected flow passages 50, 58.

Gas 40 separated from the liquid 22 may escape from the annulus 42 via the screen 28 in the intermediate section 36. If multiple intermediate sections 36 are connected together, it will be appreciated that more separated gas 40 will likely be present in the intermediate section(s) that are vertically higher. Thus, no gas 40 may escape from the annulus 42 via the screen 28 in any particular intermediate section 36.

Figure 4:
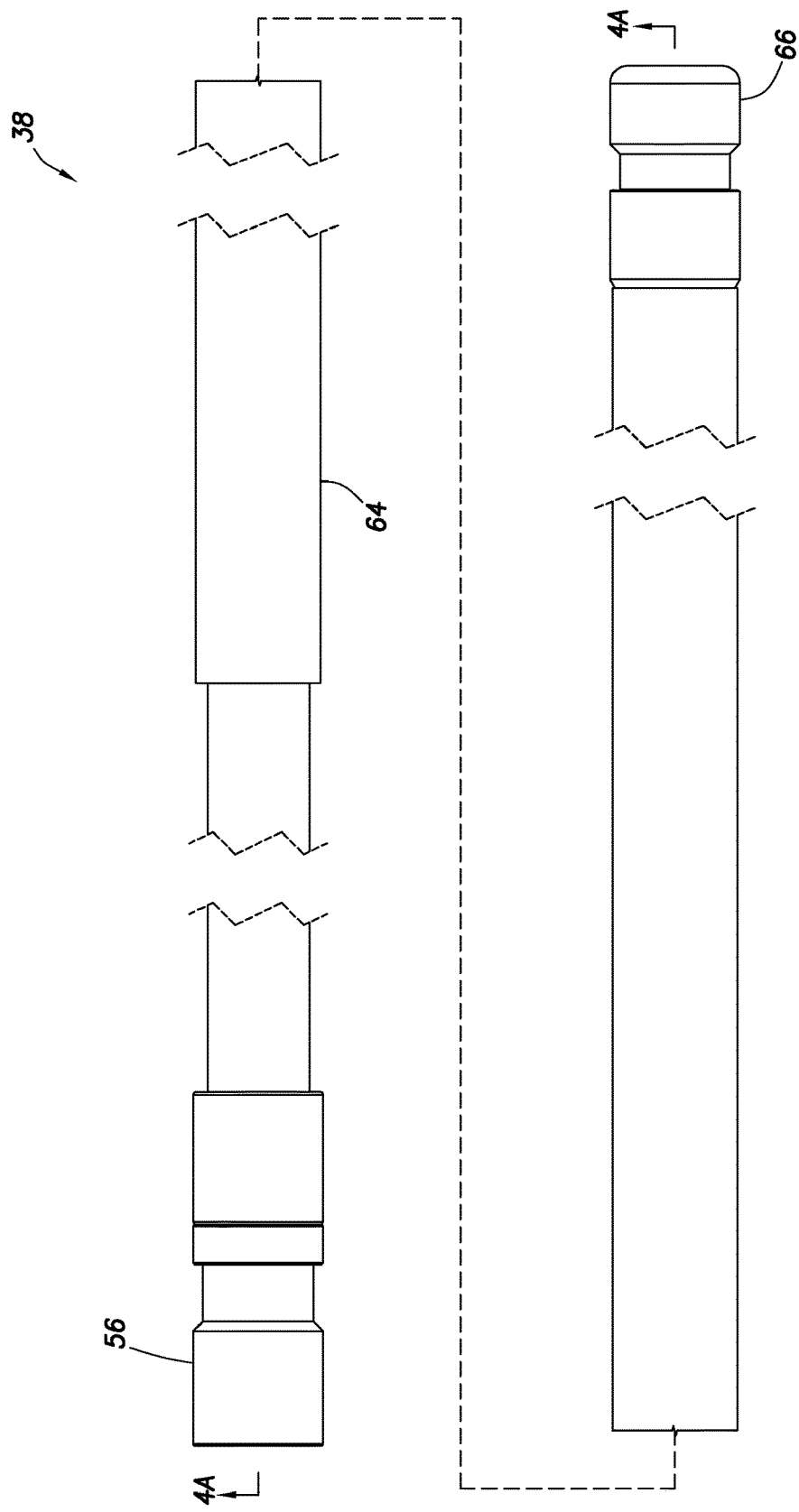
FIGS. 4-4B are representative elevational, cross-sectional and detail views of a lower section of the fluid separation apparatus.
Figure 4A:
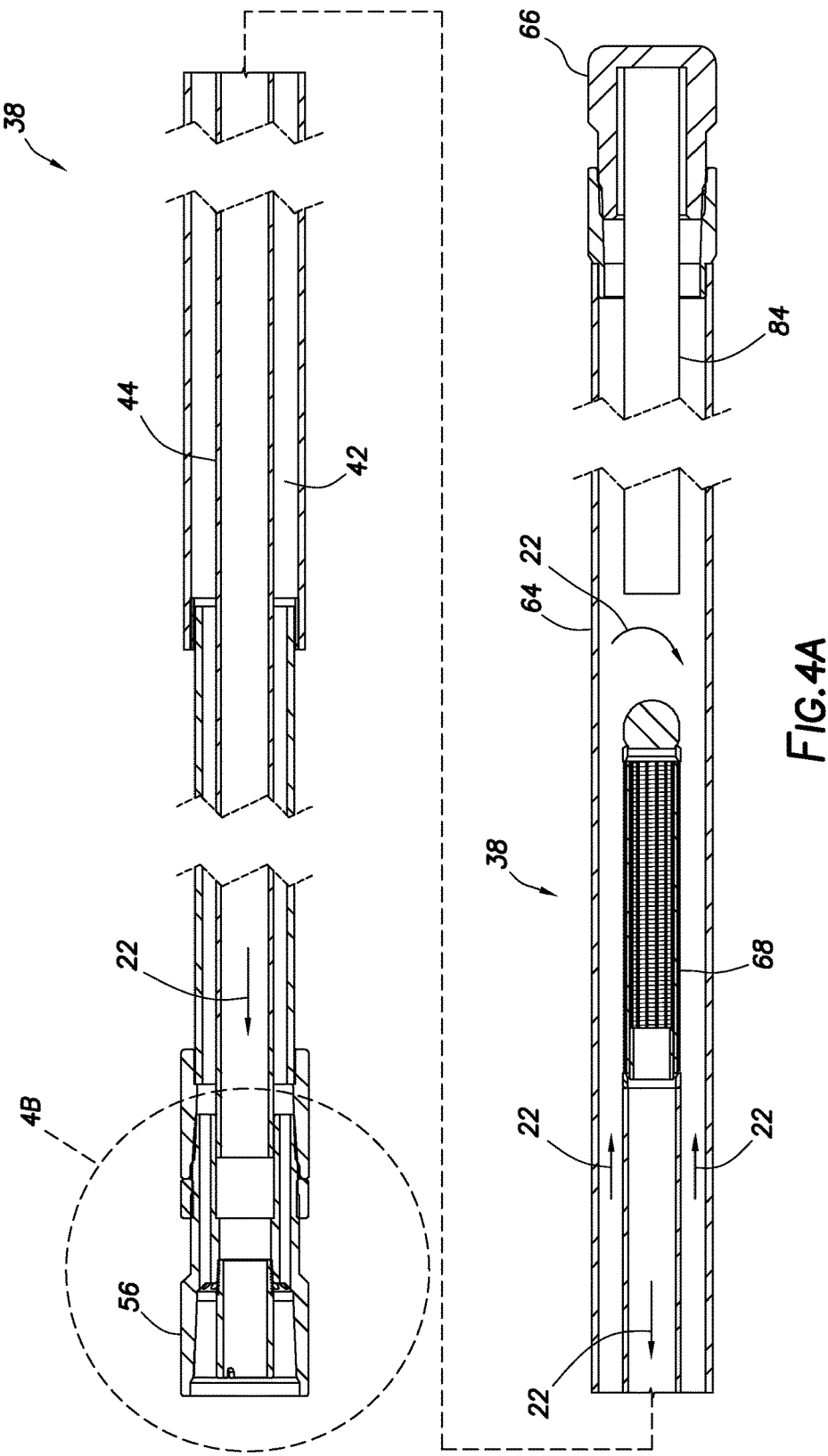

Referring additionally now to FIG. 4, the lower section 38 is representatively illustrated apart from the remainder of the apparatus 32. FIG. 4 depicts a side view, FIG. 4A depicts a cross-sectional view taken along line 4A-4A of FIG. 4, and FIG. 4B depicts an enlarged detail of an upper end of the lower section 38.

In this example, the lower section 38 includes the upper connector 56, with the inner conduit 44 extending downwardly from the upper connector. The conduit 44 is inside an outer housing 64, so that the annulus 42 is formed radially between the outer housing and the conduit.

The upper connector 56 of the lower section 38 connects to a lower connector 48 of an intermediate section 36, so that the annulus 42 of the lower section 38 receives the liquid 22 from the annulus of the intermediate section. Preferably, substantially all of the gas 40 has separated from the liquid 22 prior to the liquid flowing into the lower section 38, but in some examples there may still be some gas combined with the liquid that flows into the annulus 42 of the lower section.

Some gas 40 may separate from the liquid 22 in the annulus 42 of the lower section 38. Any gas 40 that does separate from the liquid 22 in the annulus 42 of the lower section 38 can flow upwardly to the annuli of the upper and intermediate sections 34, 36, and can at any point escape through a screen 28 into the wellbore 14 external to the apparatus 32.

Note that the inner conduit 44 of the lower section 38 does not extend to a lower connector 48 (as in the upper and intermediate sections 34, 36). Instead, a lower end of the housing 64 is closed off with a bull plug 66.

The liquid 22 that flows downward through the annulus 42 of the lower section 38 enters a screen 68 connected at a lower end of the inner conduit 44. The screen 68 preferably filters smaller particulate matter from the liquid 22, as compared to the screens 28 of the upper and intermediate sections 34, 36, although in some examples the screen 68 may not filter smaller particulate matter, or may not be included at all. The screen 68 may be a wire-wrapped screen or any other type of screen or filter.

As mentioned above, a vortex de-sander (such as that described in U.S. Pat. No. 8,881,803, or another suitable de-sander) may be used with the lower section 34. The de-sander could, for example, create a swirling flow of the liquid 22 as or before it enters the annulus 42 of the lower section 38, thereby causing particulate matter to be urged outward by its momentum, and eventually fall to the lower end of the housing 64.

The liquid 22 flows into the inner conduit 44 of the lower section 38 and upward through all inner conduits of the upper and intermediate sections 34, 36. Eventually, the liquid 22 flows to the upper connector 54 of the upper section 34, and from there can flow to the pump 20 or otherwise into the tubular string 12 above the apparatus 32.

A solid chemical treatment 84 can be included in the fluid separation apparatus 32, so that the liquid 22 is treated before it is produced to surface. As depicted in FIG. 4A, the chemical treatment 84 may be positioned in the outer housing 64 of the lower section 38.

However, other locations of the chemical treatment 84 may be used in other examples. More direct impingement of the liquid 22 on the chemical treatment 84 might be obtained by positioning the chemical treatment 84 in the conduit 44, for example.

The treatment chemicals can be selected, for example, to mitigate, prevent or treat scale, corrosion, paraffin, asphaltenes, and/or hydrogen sulfide. The treatment chemicals may perform any desired function or produce any desired effect, in keeping with the scope of this disclosure.

In the above description of the apparatus 32 example of FIGS. 2-4B, the liquid 22 flows into the inner conduit 44 substantially only via the screen 68 in the lower section 38. However, in other examples the liquid 22 could flow into the inner conduit 44 at various locations along a length of the conduit.

In one example, openings 80 could be provided through a sidewall of the inner conduit 44 in any of the sections 34, 36, 38 of the apparatus 32. The openings 80 may or may not have screens or filters for excluding particulate matter from the fluid 22 as it flows into the inner conduit 44.

One purpose for providing the openings 80 in the inner conduit 44 could be to balance flow from the wellbore 14 into the annulus 42 along the length of the apparatus 32. This could avoid creation of a "hot spot," where a relatively large flow rate of the fluid 22 and gas 40 enters a screen 28 of the upper or intermediate sections 34, 36. Such a "hot spot" could cause erosion of the screen 28 or other components of the apparatus 32.

The openings 80 could have any shape (such as, circular, oval, slotted, etc.), could be arranged in any manner (such as, straight, helical, offset, etc.), and could have any desired size or flow area. In one example, the flow area of the openings 80 could vary along the length of the apparatus 32 to thereby balance the flow of the fluid 22 and gas 40 into the annulus 42. Thus, a number and/or size of the openings 80 at one end or other location along the apparatus 32 could be different from a number and/or size of the openings 80 at an opposite end or another location along the apparatus.

The inner conduits 44 may be secured or retained in (or to) the upper and lower connectors 48, 54, 56 by any means (such as, threads, welds, slip fits, interference fits, etc.). However, it is not necessary for the inner conduits 44 to be secured or retained in or to the upper and lower connectors 48, 54, 56 at all in keeping with the scope of this disclosure (for example, the inner conduits 44 could be secured or retained in the screens 28 or outer housing 64).

The upper and lower connectors 48, 54, 56 may be connected or secured to the screens 28 and outer housing 64 by any means (such as, threads, welds, interference fits, etc.). The upper and lower connectors 54, 56 may be connected to each other by any means (such as, threads, quick connects, etc.).

Figure 5:
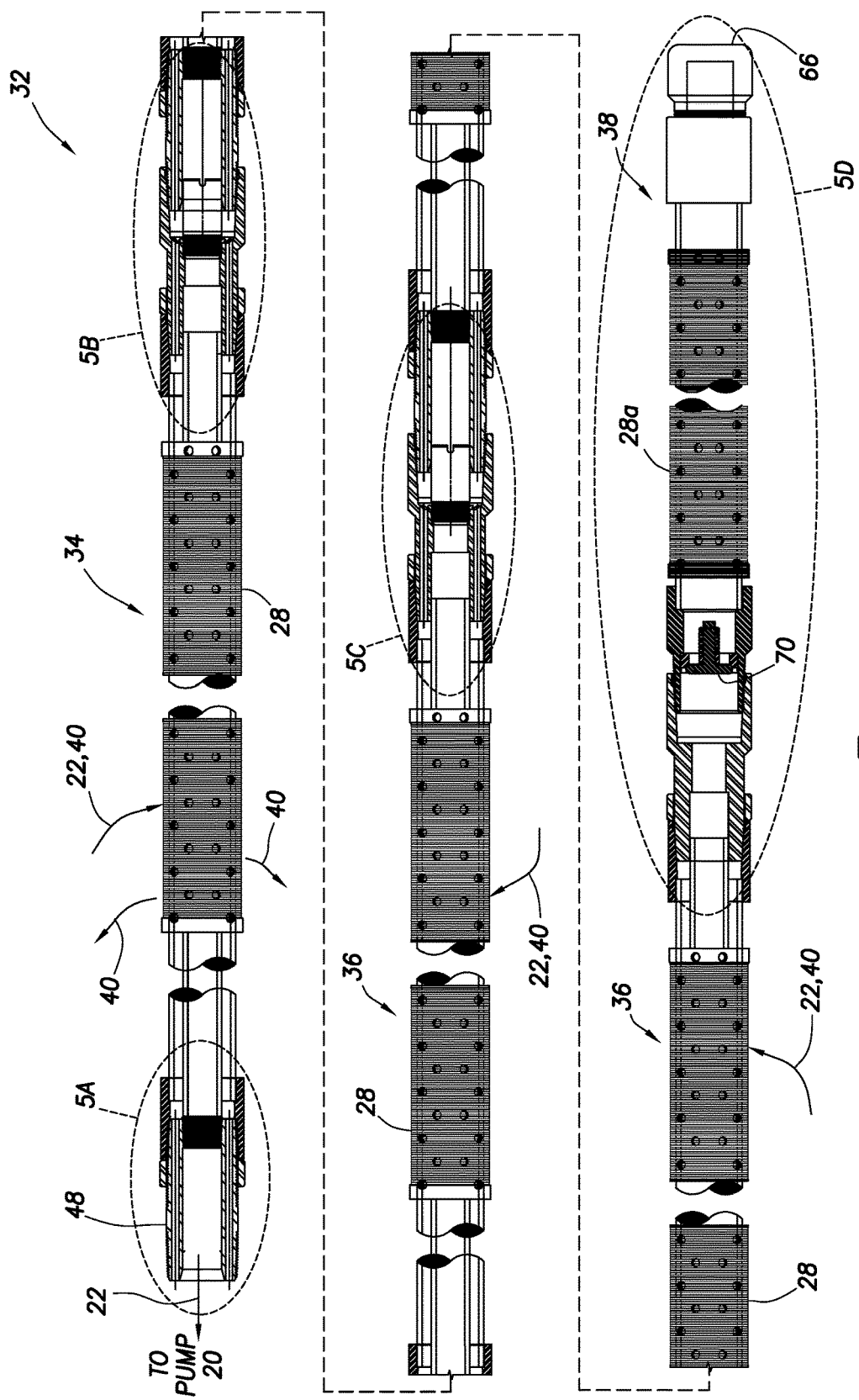
FIGS. 5-5D are representative partially cross-sectional and detail views of another example of the fluid separation apparatus.
Figure 5A:
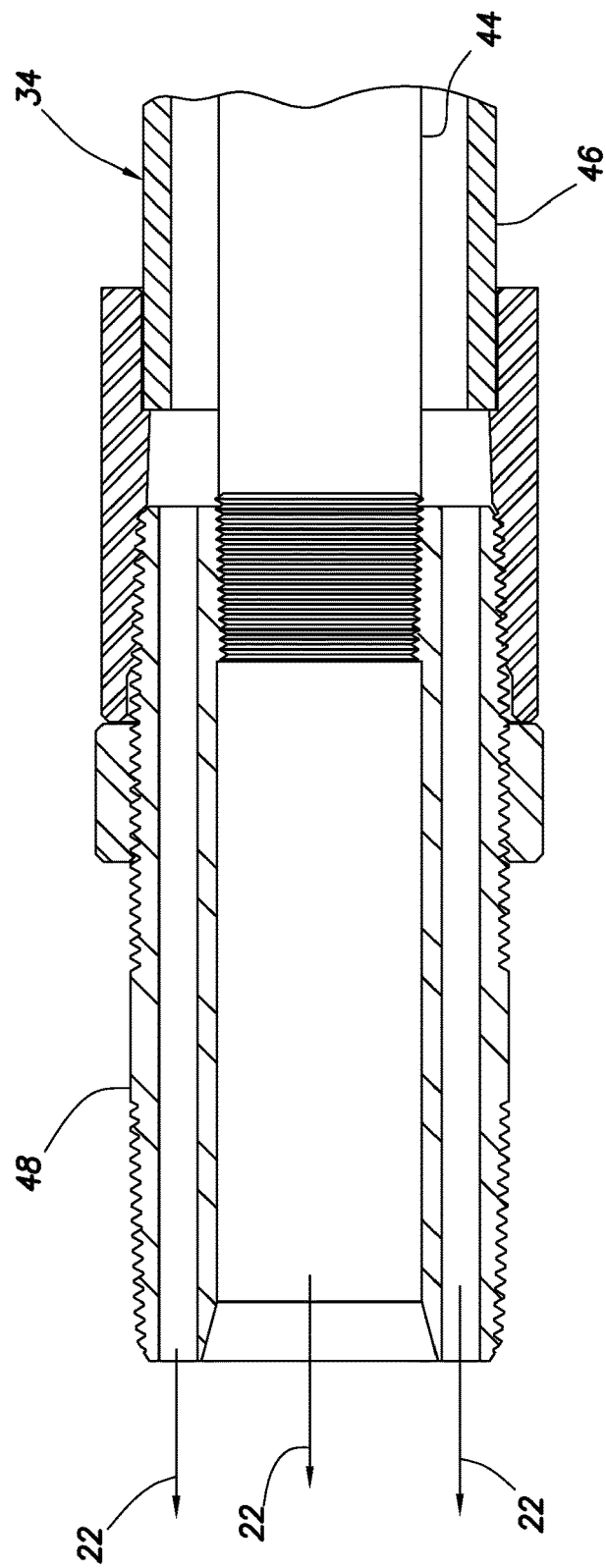
Figure 5B:
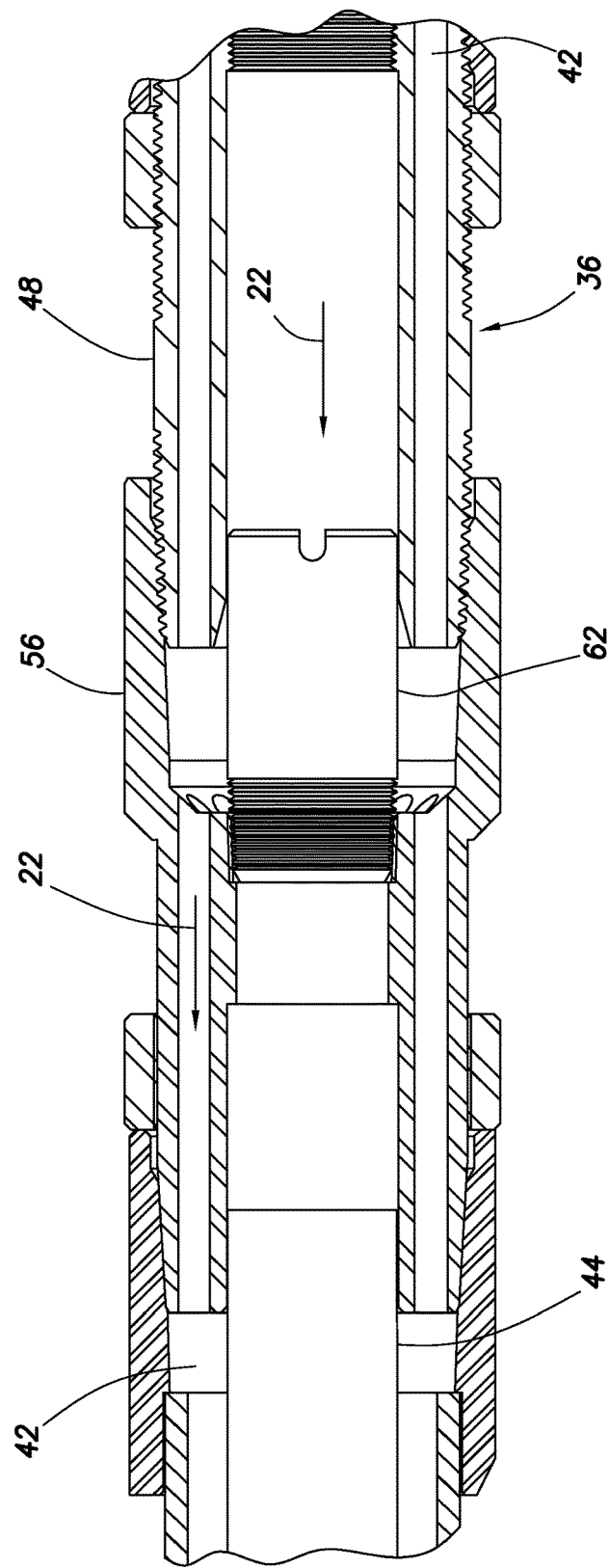
Figure 5C:
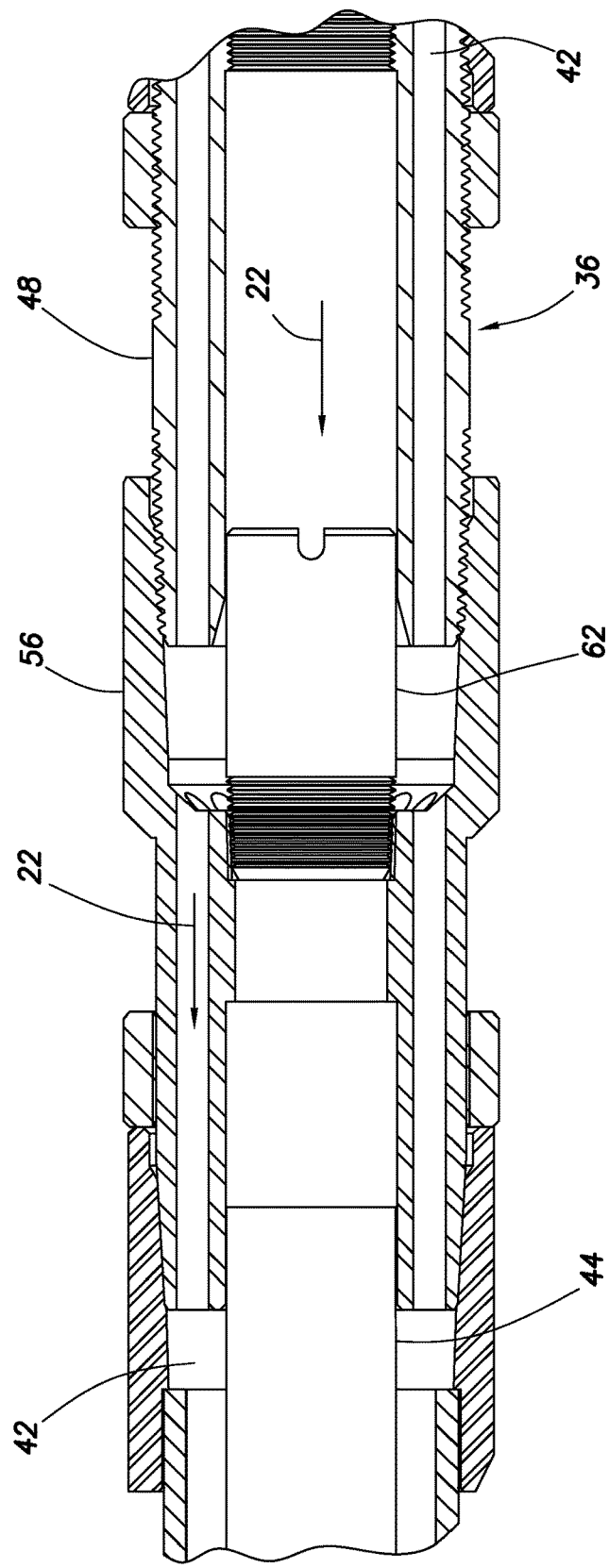
Figure 5D:
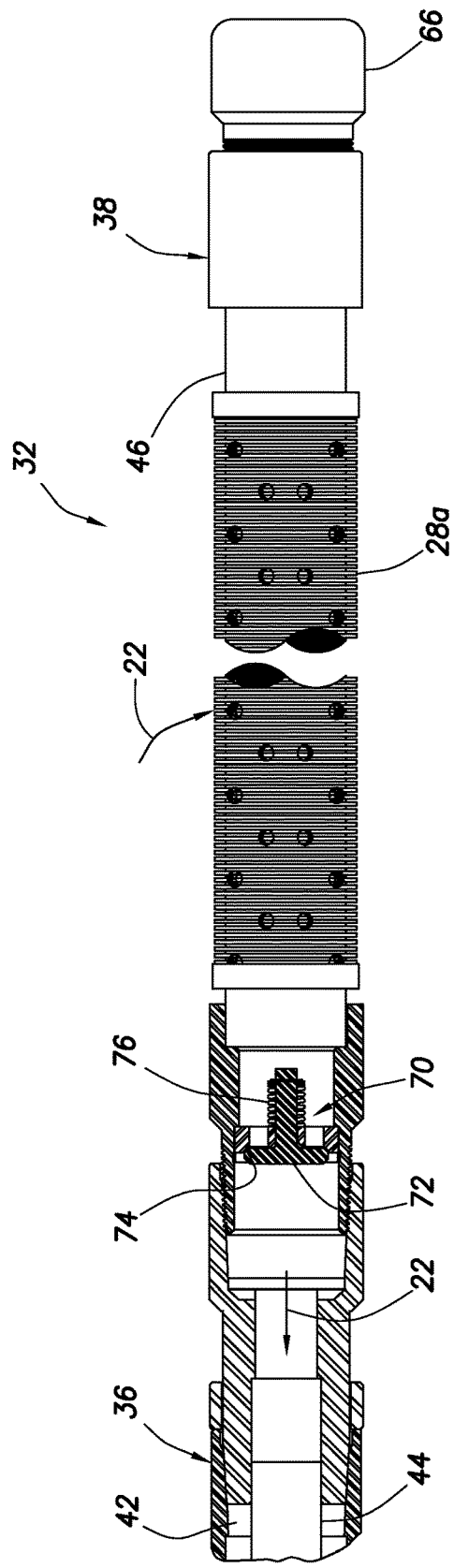

Referring additionally to FIGS. 5-5D, another example of the fluid separation apparatus 32 is representatively illustrated. FIG. 5 depicts a partially cross-sectional view of the apparatus 32, FIG. 5A depicts a detail of an upper end connection, FIGS. 5B & C depict details of intermediate connections, and FIG. 5D depicts a partially cross-sectional view of a lower end of the apparatus 32.

In this example, the liquid 22 does not enter the annulus 42 via the screens 28 and flow downwardly to enter the lower end of the inner conduit 44 via the screen 68. Instead, a connector 48 is used to connect the apparatus 32 to the pump 20, so that the liquid 22 can continuously flow upwardly through the annulus 42 to the pump.

If the screens 28 become plugged, or flow otherwise becomes restricted between the wellbore 14 and the pump 20, a pressure differential from the wellbore to the pump intake will increase accordingly. If the pressure differential reaches a predetermined level, a bypass valve 70 will open, thereby permitting flow from an interior of a screen 28a to the interior of the inner conduit 44, which is in communication with the pump 20 via the connector 48 of the upper section 34 (see detail item 1).

The screen 28a can be substantially similar to the screens 28 described above. However, in the FIGS. 5-5D example, the screen 28a takes the place of the outer housing 64 (see FIG. 4A) and filters flow of the liquid 22 into the lower section 38. The bypass valve 70 controls flow of the liquid 22 from the interior of the screen 28a base pipe 46 to the interior of the inner conduit 44. Note that, along with the liquid 22, gas 40 may also flow into the screen 28a when the bypass valve 70 opens.

The bypass valve 70 opens when the predetermined pressure differential is applied across the bypass valve. The bypass valve 70 in this example includes a poppet 72, a seat 74 and a spring 76. The spring 76 biases the poppet 72 toward sealing engagement with the seat 74 to prevent flow from the interior of the base pipe 46 to the inner conduit 44. When the predetermined pressure differential across the poppet 72 overcomes the biasing force exerted by the spring 76, the poppet disengages from the seat 74, thereby permitting flow from the interior of the screen 28a to the interior of the conduit 44, and then to the pump 20.

This allows the upper screen 28 to be the primary flow path for produced liquids 22. The liquid 22 enters the screen 28 and travels up the screen/inner conduit annulus 42 and into the pump 20 intake. Gas 40 can exit the upper screen 28 from the annulus 42.

In the event the primary screens 28 plug and sufficient differential pressure is built up across the bypass valve 70, flow enters through the lower secondary screen 28a and travels up the inner conduit 44 to the pump 20 intake and on to surface. This allows the liquid 22 to "bypass" the screens 28.

This configuration 1) isolates the bypass valve 70 from wellbore debris, 2) creates a flow path from the primary screens 28 upward to the pump 20, and 3) creates a secondary flow path below any potential flow restriction which could exist uphole in the casing 16/screen 28 annulus (see FIG. 1).

It may now be fully appreciated that the above disclosure provides significant advancements to the arts of designing, constructing and utilizing downhole separation equipment. In examples described above, the fluid separation apparatus 32 can be conveniently assembled at a wellsite with connectors 48, 54, 56 providing appropriate fluid communication between annuli 42 and inner conduits 44.

The above disclosure provides to the arts a downhole fluid separation apparatus 32. In one example, the apparatus 32 can include multiple sections 34, 36, 38 connected together with connectors 48, 54, 56. The connectors 48, 54, 56 provide fluid communication between an annulus 42 in each section and annuli 42 in adjacent ones of the sections, and the connectors 48, 54, 56 provide fluid communication between an inner conduit 44 in each section and inner conduits 44 in adjacent ones of the sections 34, 36, 38.

Each of the annuli 42 may surround a respective one of the inner conduits 44. Each of the annuli 42 may be formed radially between a respective one of the inner conduits 44 and a well screen 28.

Combined liquid 22 and gas 40 may flow downward through the connected annuli 42, and the liquid 22 may flow upward through the connected inner conduits 44. The liquid 22 and gas 40 may enter the annuli 42 via at least one well screen 28.

The inner conduits 44 may be in communication with a pump 20.

Multiple openings 80 may be formed through a sidewall of at least one of the inner conduits 44. A flow area of the openings 80 may vary along a length of at least one of the inner conduits 44.

The downhole fluid separation apparatus 32 may include a chemical treatment 84 positioned in at least one of the sections 34, 36, 38.

A downhole fluid separation system 10 with a downhole fluid separation apparatus 32 is also provided to the arts by the above disclosure. In this example, the downhole fluid separation apparatus 32 can include multiple sections 34, 36, each section having a connector 48, 56 that connects the section to an adjacent section. Each connector 48, 56 includes at least two flow passages 50, 52, 58, 60. One of the flow passages 50, 58 provides communication between an inner conduit 44 of each of the connected sections 34, 36, and the other flow passage 52, 60 provides communication between an annulus 42 of each of the connected sections 34, 36.

The annulus 42 may be formed between the inner conduit 44 and a well screen 28 of each of the sections 34, 36.

An interior of the inner conduits 44 may be in communication with a pump 20 intake. The annuli 42 may be in communication with the pump 20 intake.

At least one of the annuli 42 may be formed between the inner conduit 44 and an outer housing 64.

A bypass valve 70 may open in response to a predetermined differential pressure between an exterior of the apparatus 32 and an interior of the inner conduits 44. The bypass valve 70 may provide for selective communication between an interior of a secondary screen 28a and the interior of the inner conduits 44.

The liquid 22 may flow to a pump 20 both from the annuli 42 and from the inner conduits 44 when the bypass valve 70 is open. The liquid 22 may flow from the bypass valve 70, then through at least one primary screen 28 via the inner conduits 44, and then to the pump 20, when the bypass valve 70 is open.

Also described above is a downhole fluid separation apparatus 32 that comprises at least first and second sections 34, 36, a connector 48, 56 that connects the first and second sections 34, 36, the connector 48, 56 including at least two flow passages 50, 52, 58, 60, one of the flow passages 50, 58 providing communication between an inner conduit 44 of each of the connected first and second sections 34, 36, and the other flow passage 52, 60 providing communication between an annulus 42 of each of the connected first and second sections 34, 36, and a bypass valve 70 that opens in response to a predetermined differential pressure between an exterior of the apparatus 32 and the inner conduits 44.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A downhole fluid separation apparatus, comprising:
    multiple sections connected together with connectors, the connectors providing fluid communication between an annulus in each section and annuli in adjacent ones of the sections, and the connectors providing fluid communication between an inner conduit in each section and inner conduits in adjacent ones of the sections, wherein separated gas flows outward from the annulus,
    in which multiple openings are formed through a sidewall of at least one of the inner conduits.

2. The downhole fluid separation apparatus of claim 1, in which each of the annuli surrounds a respective one of the inner conduits.

3. The downhole fluid separation apparatus of claim 1, in which each of the annuli is formed radially between a respective one of the inner conduits and a well screen.

4. The downhole fluid separation apparatus of claim 1, in which combined liquid and gas flow downward through the connected annuli, and the liquid flows upward through the connected inner conduits.

5. The downhole fluid separation apparatus of claim 1, in which the liquid and gas enter the annuli via at least one well screen.

6. The downhole fluid separation apparatus of claim 1, in which the inner conduits are in communication with a pump.

7. The downhole fluid separation apparatus of claim 1, in which a flow area of the openings varies along a length of the at least one of the inner conduits.

8. The downhole fluid separation apparatus of claim 1, further comprising a chemical treatment positioned in at least one of the sections.

9. A downhole fluid separation system for use with a subterranean well, the system comprising:
    a downhole fluid separation apparatus in the well, the apparatus including multiple sections, each section having a connector that connects the section to an adjacent section, each connector including at least two flow passages, one of the flow passages providing communication between an inner conduit of each of the connected sections, and the other flow passage providing communication between an annulus of each of the connected sections, wherein separated gas flows outward from the annulus,
    in which multiple openings are formed through a sidewall of at least one of the inner conduits.

10. The downhole fluid separation system of claim 9, in which the annulus is formed between the inner conduit and a well screen of each of the sections.

11. The downhole fluid separation system of claim 10, in which an interior of the inner conduits is in communication with a pump intake.

12. The downhole fluid separation system of claim 11, in which the annuli are in communication with the pump intake.

13. The downhole fluid separation system of claim 9, in which at least one of the annuli is formed between the inner conduit and an outer housing.

14. The downhole fluid separation system of claim 9, in which a bypass valve opens in response to a predetermined differential pressure between an exterior of the apparatus and an interior of the inner conduits.

15. The downhole fluid separation system of claim 14, in which the bypass valve provides for selective communication between an interior of a screen and the interior of the inner conduits.

16. The downhole fluid separation system of claim 15, in which liquid flows to a pump both from the annuli and from the inner conduits when the bypass valve is open.

17. The downhole fluid separation system of claim 14, in which liquid flows from the bypass valve, then through at least one primary screen via the inner conduits, and then to the pump, when the bypass valve is open.

18. The downhole fluid separation system of claim 9, further comprising a chemical treatment positioned in at least one of the sections.

19. A downhole fluid separation apparatus, comprising:
    at least first and second sections;
    a connector that connects the first and second sections, the connector including at least two flow passages, one of the flow passages providing communication between an inner conduit of each of the connected first and second sections, and the other flow passage providing communication between an annulus of each of the connected first and second sections, wherein separated gas flows outward from the annulus; and
    a bypass valve that opens in response to a predetermined differential pressure between an exterior of the apparatus and the inner conduits,
    in which multiple openings are formed through a sidewall of at least one of the inner conduits.

20. The downhole fluid separation apparatus of claim 19, in which the annulus is formed between the inner conduit and a well screen of each of the first and second sections.

21. The downhole fluid separation apparatus of claim 20, in which an interior of the inner conduits is in communication with a pump intake.

22. The downhole fluid separation apparatus of claim 21, in which the annuli are in communication with the pump intake.

23. The downhole fluid separation apparatus of claim 19, in which at least one of the annuli is formed between the inner conduit and an outer housing.

24. The downhole fluid separation apparatus of claim 19, in which the bypass valve provides for selective communication between an interior of a screen and the interior of the inner conduits.

25. The downhole fluid separation apparatus of claim 24, in which liquid flows to a pump both from the annuli and from the inner conduits when the bypass valve is open.

26. The downhole fluid separation apparatus of claim 19, in which liquid flows from the bypass valve, then through at least one primary screen via the inner conduits, and then to the pump, when the bypass valve is open.

27. The downhole fluid separation apparatus of claim 19, further comprising a chemical treatment positioned in at least one of the sections.

* * * * *